(12) United States Patent
Lee et al.

(10) Patent No.: US 8,901,782 B2
(45) Date of Patent: Dec. 2, 2014

(54) DISPLAY APPARATUS, POWER SUPPLY APPARATUS AND POWER SUPPLY METHOD THEREOF

(75) Inventors: Se-ra Lee, Suwon-si (KR); Jin-hyung Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 925 days.

(21) Appl. No.: 13/069,044

(22) Filed: Mar. 22, 2011

(65) Prior Publication Data

US 2012/0044230 A1    Feb. 23, 2012

(30) Foreign Application Priority Data

Aug. 17, 2010  (KR) .......................... 10-2010-0079243

(51) Int. Cl.
  *H02H 11/00*    (2006.01)
(52) U.S. Cl.
  USPC .......................................................... 307/326
(58) Field of Classification Search
  USPC .......................................................... 307/326
  See application file for complete search history.

(56) References Cited

U.S. PATENT DOCUMENTS 5,140,511 A * 8/1992 Lee et al. .................... 363/21.07

* cited by examiner

*Primary Examiner* — Robert L. Deberadinis
(74) *Attorney, Agent, or Firm* — Sughrue Mion, PLLC (57) ABSTRACT

A display apparatus, a power supply apparatus and a power supply method thereof are provided. The display apparatus includes: a signal processor which processes an image signal; a display unit which displays thereon an image corresponding to the processed image signal; and a power supply unit which receives an input of AC power and supplies operating power to the display unit. The power supply unit includes a discharging circuit unit which discharges a remaining voltage of the power supply unit if the input of the AC power is suspended, and does not discharge the voltage if the AC power is input. Accordingly, a remaining voltage from a power supply unit is effectively removed if an input of AC power is suspended, and power consumption does not occur if the AC power is input.

16 Claims, 7 Drawing Sheets

DISPLAY APPARATUS, POWER SUPPLY APPARATUS AND POWER SUPPLY METHOD THEREOF

CROSS-REFERENCE TO RELATED APPLICATION

This application claims priority from Korean Patent Application No. 10-2010-0079243, filed on Aug. 17, 2010 in the Korean Intellectual Property Office, the disclosure of which is incorporated herein by reference.

BACKGROUND

1. Field

Apparatuses and methods consistent with exemplary embodiments relate to a display apparatus, a power supply apparatus and a power supply method thereof, and more particularly, to a display apparatus, a power supply apparatus and a power supply method thereof which include a discharging circuit that removes a remaining voltage from a power supply unit when alternating current (AC) power supply is cut off and does not consume power in a standby mode.

2. Description of the Related Art

A display apparatus such as a television (TV) includes a power supply unit which receives and converts AC commercial power into operating power at a level necessary for elements receiving such power and supplies the converted operating power to the elements.

Figure 1A:
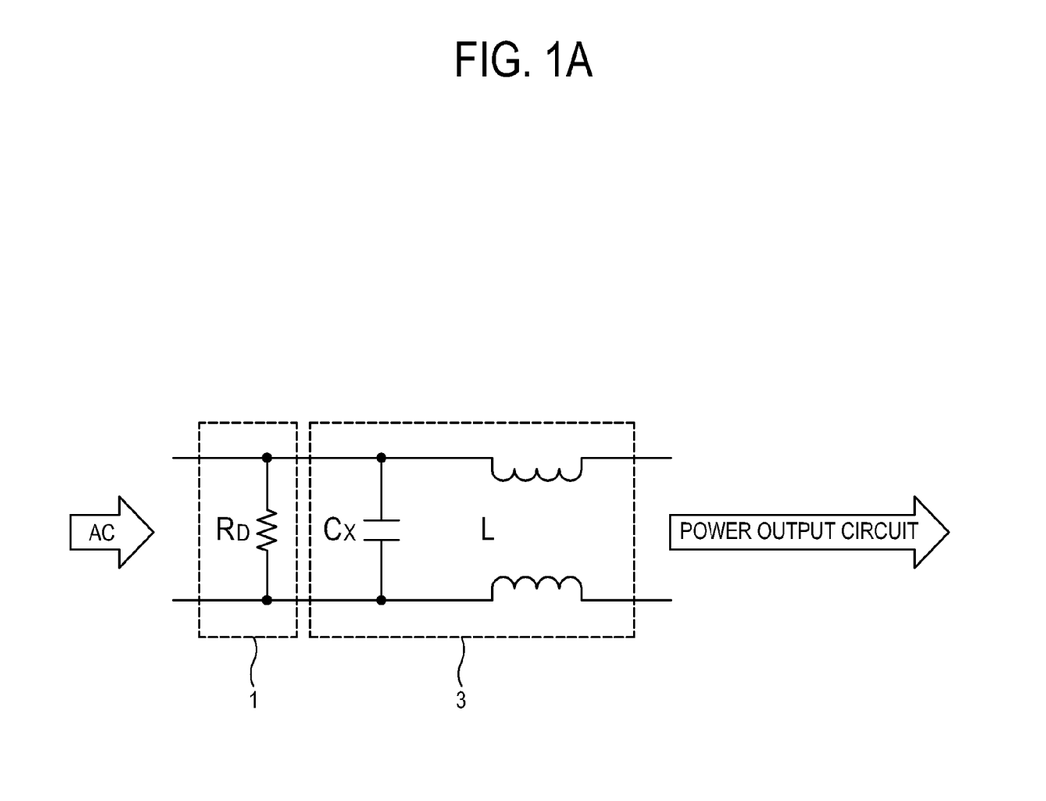
FIG. 1A is a related art AC power input circuit diagram of a power supply unit in a conventional TV.

FIG. 1A illustrates an AC power input circuit diagram of a power supply unit of a related TV. As shown therein, the related art AC power input circuit includes a discharging resistor 1 and a noise-reducing AC filter 3. The AC filter includes a capacitor and an inductor, and when a TV operates generally, a voltage equivalent to an AC input voltage is charged to the capacitor. If a user unplugs the display apparatus, the discharging resistor 1 discharges a voltage charged to the capacitor (hereinafter, to be called "remaining voltage") since the remaining voltage may cause an electric shock.

Figure 1B:
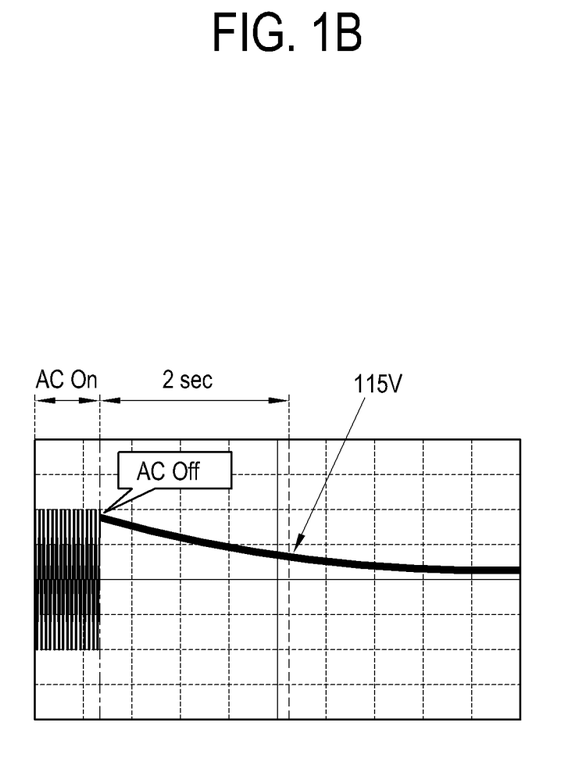
FIGS. 1B and 1C illustrate a function of a discharging resistor which is included in the related art AC power input circuit diagram in FIG. 1A.

FIGS. 1B and 1C illustrate a function of the discharging resistor 1 included in the related art AC power input circuit diagram of FIG. 1A. As shown in FIG. 1B, if the discharging resistor 1 is not provided in the AC power input circuit, a natural discharge of the remaining voltage from the capacitor requires a long discharge time and causes an electric shock after the input of the AC power is cut off. As shown therein, 115V still remains even after two seconds has elapsed.

Figure 1C:
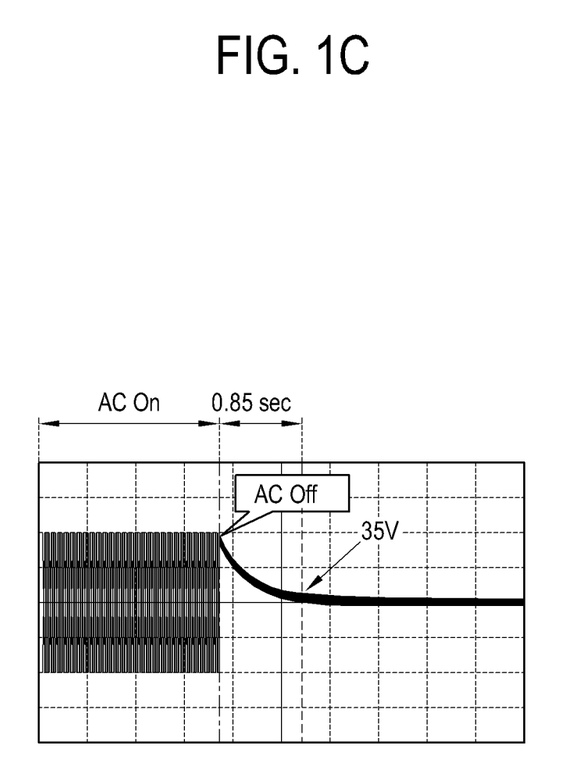

As shown in FIG. 1C, if the discharging resistor is provided in the AC power input circuit, the remaining voltage is discharged in a very short time of 0.85 seconds after the input of the AC power is cut off. In that respect, the discharging resistor should be provided in the AC power input circuit.

However, as in the related art AC power input circuit diagram in FIG. 1A, the discharging resistor 1 receives a voltage which is the same as the AC input voltage and consumes power unnecessarily when the AC input voltage is applied to the AC input circuit, because the discharging resistor is connected in parallel to the AC input voltage. The power consumed by the discharging resistor 1 accounts for a considerable amount of the power consumed in a standby mode, which is a waste of energy.

SUMMARY

One or more exemplary embodiments provide a display apparatus, a power supply apparatus and a power supply method thereof which includes a discharging circuit unit that reduces a remaining voltage from a power supply unit when AC power supply is cut off, and does not consume power in a standby mode.

According to an aspect of an exemplary embodiment, there is provided a display apparatus including: a signal processor which processes a predetermined image signal; a display unit which displays thereon an image corresponding to the processed image signal; and a power supply unit which supplies operating power to the display unit with input AC power, the power supply unit comprising a discharging circuit unit which discharges a remaining voltage of the power supply unit if the input of the AC power is suspended, and does not discharge the voltage even if the AC power is input.

The discharging circuit unit may include a discharging device which discharges the remaining voltage of the power supply unit, and a first switch which controls a current flowing in the discharging device, and the first switch may be turned on when the input of the AC power is suspended.

The display apparatus may further include a photo coupler which is connected to a first end of the first switch and outputs a signal to a reset circuit that resets the display apparatus, and the first switch may turn on the photo coupler when the first switch is turned on.

The display apparatus may further include an AC power detecting circuit unit which is connected to a first end of the discharging device and detects the input of the AC power.

The AC power detecting circuit unit may include a detecting device which detects the AC power, and a second switch which is controlled corresponding to the detection of the AC power, and the second switch may be turned on when the AC power is detected by the detecting device.

The detecting device may detect AC power with a predetermined voltage in a standby mode in which power consumption is reduced.

The discharging device may include at least one of a diode and a resistance device.

The detecting device may include at least one zener diode.

The power supply unit may further include an AC filter which filters the AC power, and the discharging circuit unit may discharge a remaining voltage of the AC filter.

According to an aspect of another exemplary embodiment, there is provided a power supply apparatus of an electric device, the power supply apparatus including: an AC filter which filters input AC power; a rectifier which rectifies an output current of the AC filter; an AC power detecting circuit unit which detects the input of the AC power from the rectified current; and a discharging circuit unit which discharges a remaining voltage of the power supply unit if the input of the AC power is not detected by the AC power detecting circuit unit, and does not discharge the voltage if the input of the AC power is detected.

The discharging circuit unit may include a discharging device which discharges the remaining voltage of the power supply unit, and a first switch which controls a current flowing in the discharging device, and the first switch may be turned on when the input of the AC power is suspended.

The power supply apparatus may further include a photo coupler which is connected to a first end of the first switch and outputs a signal to a reset circuit that resets the display apparatus, and the first switch may turn on the photo coupler when the first switch is turned on.

The AC power detecting circuit unit may include a detecting device which detects the AC power, and a second switch which is controlled corresponding to the detection of the AC power by the detecting device, and the second switch may be turned on when the AC power is detected by the detecting device.

The discharging device may include at least one of a diode and a resistance device.

The detecting device may include at least one zener diode.

According to an aspect of another exemplary embodiment, there is provided a power supply method which receives AC power and supplies operating power to an electric device with the AC power, the method including: detecting an input of AC power by an AC power detecting circuit unit; and discharging a remaining voltage of the power supply unit if the input of the AC power is not detected by the discharging circuit unit according to the detection result, and not discharging the voltage if the input of the AC power is detected.

The discharging circuit unit may include a discharging device which discharges the remaining voltage of the power supply unit, and a first switch which controls a current flowing in the discharging device, and the not discharging the voltage may include turning off the first switch and cutting off the current flow to the discharging device if the input of the AC power is detected.

The method may further including turning on a photo coupler by the turned-on first switch and outputting a signal to a reset circuit that resets the electric device.

The AC power detecting circuit unit may include a detecting device which detects the AC power, and a second switch which is controlled corresponding to the detection of the AC power by the detecting device, and the method may further include turning on the second switch if the AC power is detected by the detecting device.

The detecting device may detect AC power having a predetermined voltage in a standby mode in which power consumption is reduced.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 2:
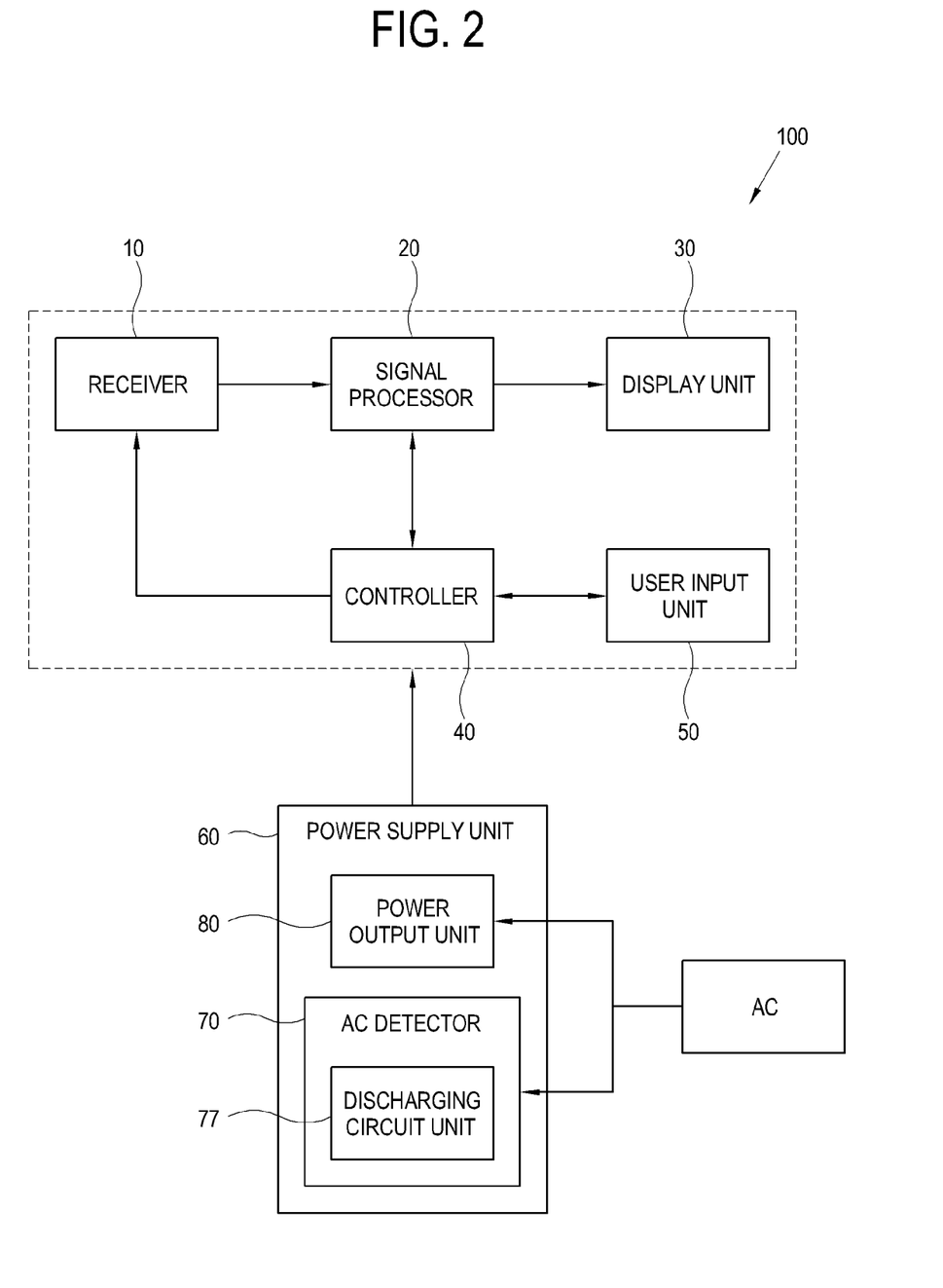
FIG. 2 is a control block diagram of a display apparatus according to an exemplary embodiment.

FIG. 2 is a control block diagram of a display apparatus according to an exemplary embodiment.

As shown therein, a display apparatus 100 according to an exemplary embodiment includes a receiver 10, a signal processor 20, a display unit 30, a controller 40, a user input unit 50 and a power supply unit 60.

The display apparatus 100 receives, processes and displays an image signal from an external image supply source (not shown). The external image supply source may include various image supply sources, including, without limitation, a computer main body (not shown) which includes a central processing unit (CPU) (not shown) and a graphic card (not shown) and generates and provides by a local connection, an image signal, a server (not shown) which provides an image signal through a network, and a transmission device of a broadcasting station (not shown) which transmits a broadcasting signal through wireless or wired transmission mediums.

Accordingly, the receiver 10 may receive an image and/or audio signal from various image supply sources as above.

The receiver 10 may receive a radio frequency (RF) signal in a wireless manner from a broadcasting transmission device, or an image signal according to composite video, component video, super video, SCART, or High Definition Multimedia Interface (HDMI) standards. The receiver 10 may further include an antenna (not shown) and/or a tuner (not shown) to tune a broadcasting signal.

The signal processor 20 may process an image and/or audio signal received by the receiver 10. Accordingly, the signal processor 20 may include an image signal processor (not shown) to process the received image signal and an audio signal processor (not shown) to process the received audio signal.

The image signal processor may further perform various preset image processings to an image signal. For example, the image processing by the image signal processor may further include decoding/encoding image signals corresponding to various image formats, deinterlacing, converting a frame fresh rate, reducing noise to improve a picture quality, enhancing a detail of images, and line scanning, but are not limited thereto. The foregoing image processings may be individually or collectively performed.

The audio signal processor (not shown) performs various preset audio processings with respect to an audio signal. The audio processing by the audio signal processor includes, without limitation, conversion of analog audio signals into digital signals, amplification of audio signals, adjustment of an output level of audio signals, and adjustment of a frequency of audio signals. The foregoing audio processings may be performed individually or collectively. Accordingly, the display apparatus 100 may further include a speaker (not shown) to output an audio corresponding to an audio signal processed by the audio signal processor.

The display unit 30 displays thereon an image corresponding to an image signal processed by the signal processor 20. The display unit 30 may display a single image frame by arranging a plurality of horizontal scanning lines scanned by the signal processor 20 in a vertical direction. The display unit 30 includes a display panel (not shown) to display the image, and a panel driver (not shown). The display panel may include a liquid crystal display (LCD) panel including a liquid crystal layer, an organic light emitting diode (OLED) panel including an organic light emitting layer, or a plasma display panel (PDP), but are not limited thereto.

The controller 40 controls other elements of the display apparatus 100 as a whole, and may include firmware as a control program, and a central processing unit (CPU) and a random access memory (RAM) to execute the control program.

The user input unit 50 receives a user's input and may include, for example, a remote controller, a manipulation panel or a touch panel. The user input unit 50 may include an input key to select powering on or off of the display apparatus 100. The user's input received by the user input unit 50 is transmitted to the controller 40, The power supply unit 60 supplies operating power to the display unit 30 with input AC power, and includes a discharging circuit unit 77 which discharges a remaining voltage of the power supply unit if the input of the AC power is suspended, and does not discharge the voltage even if the AC power is input. The power supply unit 60 supplies operating power to other elements of the display apparatus 100, e.g., the receiver 10, the signal processor 20, the controller 40, and the user input unit 50.

If the input of the AC power is suspended, e.g., if the display apparatus 100 is unplugged, an electric shock due to the remaining voltage may be prevented by the discharging circuit unit 77. Also, even if the AC power is input, the discharging circuit unit 77 does not discharge the voltage and unnecessary power consumption may be prevented.

The power supply unit 60 includes an AC detector 70 and a power output unit 80.

Upon the input of AC power from an external source, the AC power is transmitted to the AC detector 70 and the power output unit 80. The AC detector 70 not only detects the input of the AC power but also discharges the remaining voltage as it include the discharging circuit unit 77. This will be described in more detail with reference to FIG. 3.

The power output unit 80 includes a main power output unit (not shown) and a standby power output unit (not shown). If the display apparatus 100 according to the exemplary embodiment operates in a normal mode, the main power output unit outputs the AC power received from the external source to supply operating power to other elements of the display apparatus 100. If the display apparatus 100 operates in a standby mode, the standby power output unit outputs the AC power and supplies operating power to other elements of the display apparatus 100.

Figure 3:
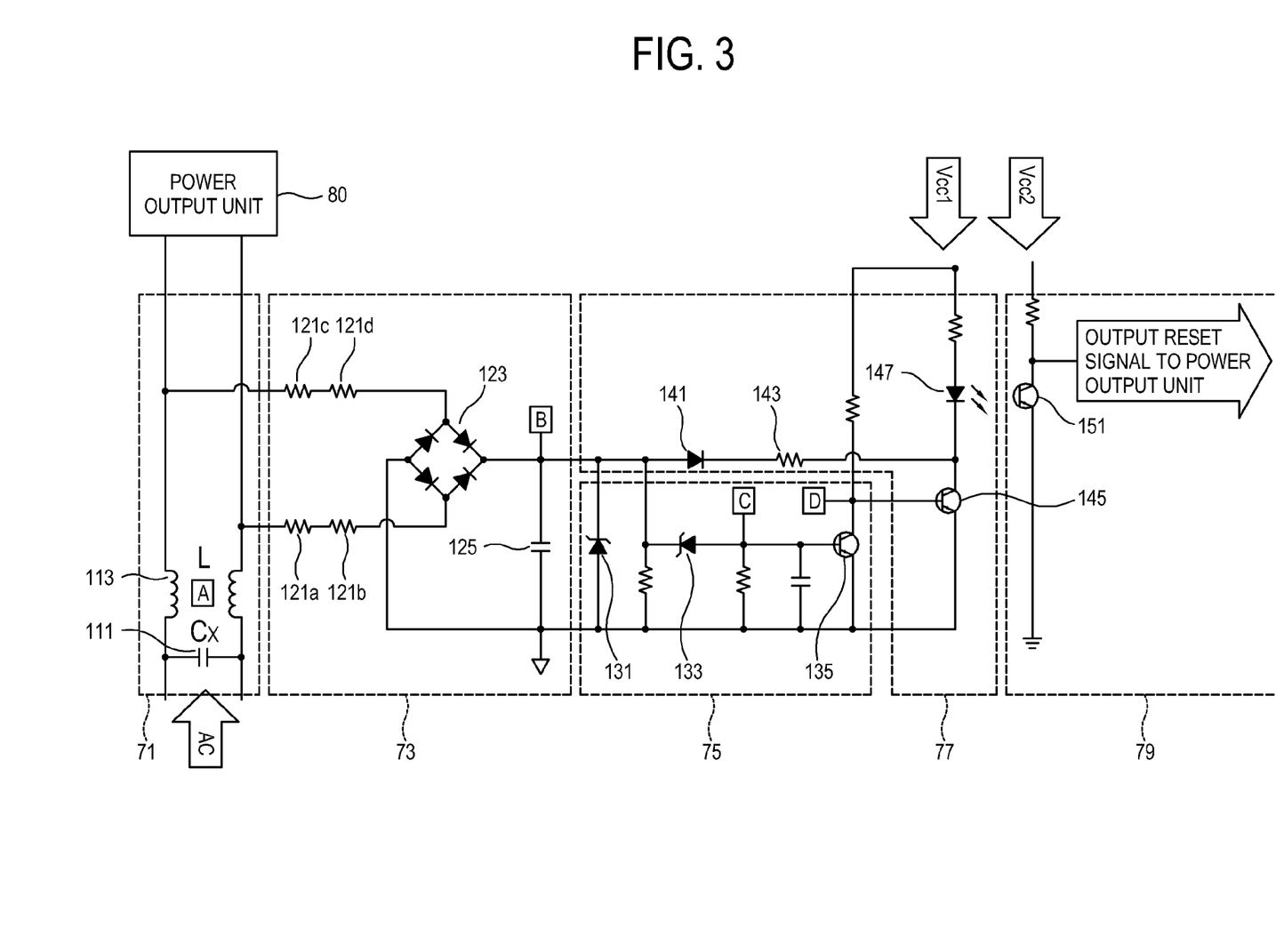
FIG. 3 is a circuit diagram of an AC detector in FIG. 2.

FIG. 3 is a circuit diagram of a detailed configuration of the AC detector 70 of the power supply unit 60 in FIG. 2. The AC detector 70 includes an AC filter 71, a rectifier 73, an AC power detecting circuit unit 75, the discharging circuit unit 77, and a reset signal output unit 79.

The AC filter 71 filters and reduces noise from the input AC power. The AC filter 71 may include a first capacitor 111 and an inductor 113 which are connected to both lines of a power cord. When the display apparatus 100 operates in a normal mode, a predetermined voltage is charged to the first capacitor 111.

The rectifier 73 rectifies a current output by the AC filter 71 and converts AC power into DC power. The rectifier 73 includes distribution circuits 121a to 121d to decrease a voltage level of a current output by the AC filter 71, a rectifying circuit 123 to rectify the current with the decreased voltage level, and a smoothing capacitor 125 to reduce a ripple from the current rectified by the rectifying circuit 123.

The distribution circuits 121a to 121d may include a passive resistance device, and the rectifying circuit 123 may include a bridge diode.

The AC power detecting circuit unit 75 includes detecting devices 131 and 133 to detect AC power, and a second switch 135 to be controlled corresponding to the detection of the AC power by the detecting devices 131 and 133.

The detecting devices 131 and 133 detect whether the current output by the rectifier 73 has a predetermined reference voltage value or more. If the current output by the rectifier 73 has the predetermined reference voltage value or more, the detecting devices 131 and 133 flow the current, and may not flow the current if the current has a voltage value below the predetermined reference voltage value. The detecting devices 131 and 133 may include at least one zener diode. The detecting devices 131 and 133 may detect AC power having a predetermined voltage when the display apparatus 100 operates in a standby mode to reduce power consumption.

The discharging circuit unit 77 includes discharging devices 141 and 143 to discharge a remaining voltage of the power supply unit 60, and a first switch 145 to control a current flow through the discharging devices 141 and 143.

If AC power is not input, the detecting devices 131 and 133 do not detect the AC power, and thus the second switch 135 is turned off. As operating power Vcc1 which is supplied by a supply source (not shown) flows to a base terminal of the first switch 145 and turns on the first switch 145. Then, the remaining voltage which is charged to the first capacitor 111 does not flow to the detecting circuit unit 75, but instead flows to the discharging devices 141 and 143 and is discharged accordingly.

The discharging devices 141 and 143 may include at least one of a diode and a passive resistance device.

The discharging circuit unit 77 may further include a photo coupler 147 which is connected to a first end of the first switch 145 and outputs a signal to a reset circuit (not shown) to reset the display apparatus 100. If the input of the AC power is suspended and the first switch 145 is turned on, the first switch 145 turns on the photo coupler 147, and an optic signal is output to the reset signal output unit 79.

The reset signal output unit 79 includes a third switch 151 which is controlled corresponding to a reception of a reset signal from the photo coupler 147. If the photo coupler 147 outputs a photoelectron as a reset signal, the reset signal output unit 79 receives the output photoelectron with a base, and thus the third switch 151 is turned on by operating power Vcc2 supplied from a supply source (not shown) and the reset voltage becomes low. If the reset voltage becomes low, the power output unit 80 including a reset circuit (not shown) determines that the reset voltage is the reset signal and resets the display apparatus 100.

If the photo coupler 147 is turned off, the third switch 151 is turned off and a reset voltage becomes high by operating power Vcc2 supplied from the supply source. The power output unit 80 determines that the reset voltage becomes high and does not reset the display apparatus 100.

That is, if AC power is input, the input power has a voltage value higher than a predetermined reference voltage value. Then, a current flow to a base terminal of the second switch 135 through the detecting devices 131 and 133 and the second switch 135 is turned on. Accordingly, the operating power Vcc1 of the first switch 145 connected to a first end of the second switch 135 is supplied to the second switch 135 and the first switch 145 is turned off. As the first switch 145 is turned off, the discharging device connected to the first end of the first switch 145 does not receive the current and therefore does not consume power even if the AC power is input. Such operation is performed in a standby mode of the display apparatus 100 according to the present exemplary embodiment.

If the display apparatus 100 operates in a normal mode, a voltage which is output through the rectifier 73 may be set to be the same as the operating power Vcc1 supplied from the supply source. Even in the normal mode, a current flow is the same as in the standby mode.

If the AC power is not input, a remaining voltage which is charged to the first capacitor 111 of the AC filter 71 flows, and has a voltage value below the predetermined reference voltage value of the detecting devices 131 and 133. Then, the current does not flow to the detecting devices 131 and 133 and the second switch 135 is not turned on. As the second switch 135 is turned off, the operating power Vcc1 is supplied to the base terminal of the first switch 145 and the first switch 145 is turned on. Due the first switch 145 being turned on, the remaining voltage is discharged by the discharging devices 141 and 143.

Figure 4:
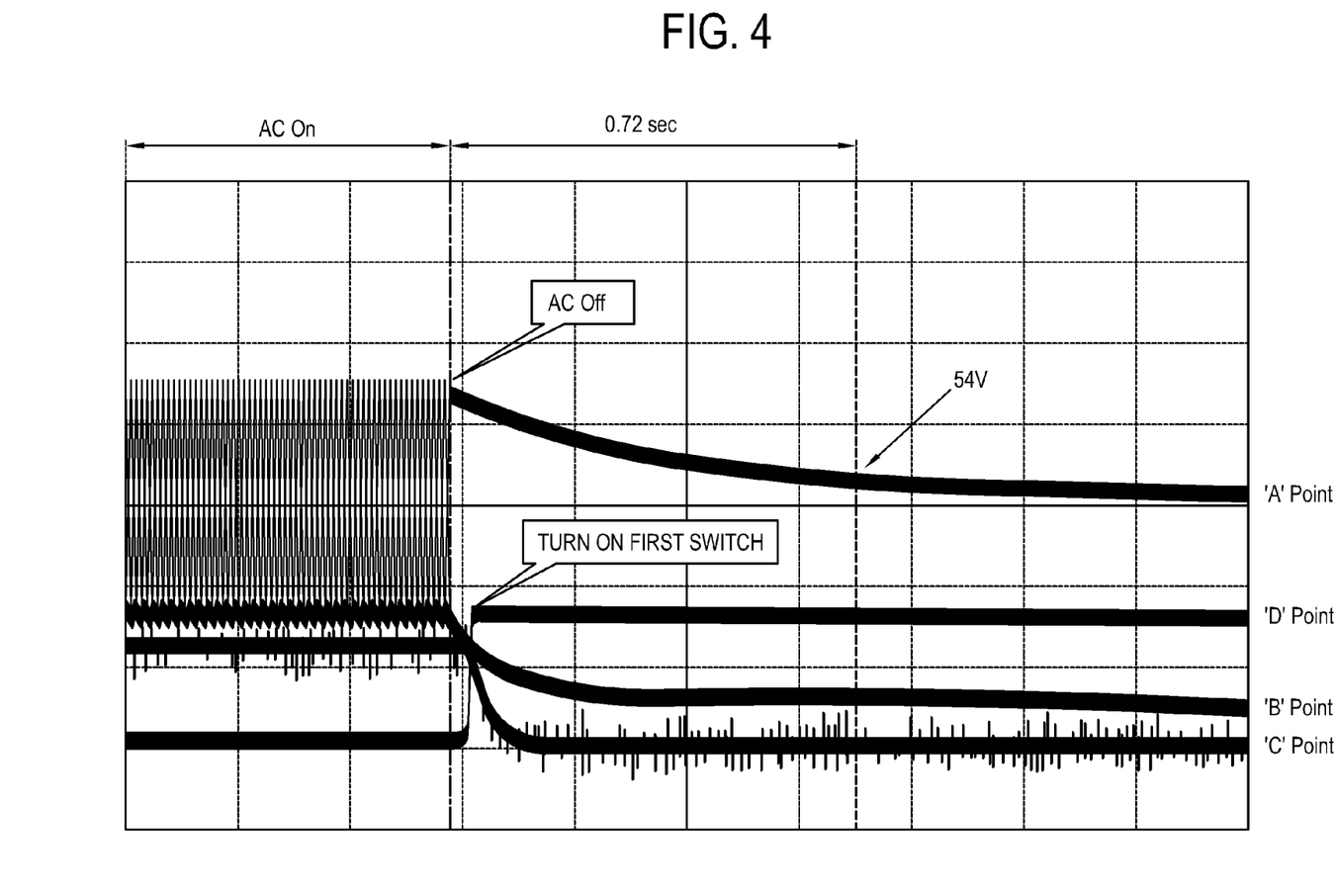
FIG. 4 illustrates a current flow in each element of the AC detector of the display apparatus according to the exemplary embodiment.

FIG. 4 illustrates a current flow of elements of the power supply unit 60 of the display apparatus 100 according to the exemplary embodiment.

An "A" point refers to a remaining voltage of the first capacitor 111 of the AC filter 71, a "B" point refers to a voltage of the smoothing capacitor 125 of the rectifier 73, a "C" point refers to a voltage of a base terminal of the second switch 135 of the AC power detecting circuit unit 75, and a "D" point refers to a voltage of a base terminal of the first switch 145 of the discharging circuit unit 77.

As shown therein, if an input of AC power is suspended, voltages of the "B" point and the "C" point become lower. This means that the voltage of the smoothing capacitor 125 of the rectifier 73 becomes lower due to the non-input of the AC power, and the voltage of the base terminal of the second switch 135 becomes lower, thereby turning off the second switch 135.

The voltage of the "D" point becomes higher if the AC power is suspended. This means that the voltage of the base terminal of the first switch 145 becomes higher due to the supply of the operating power Vcc1, and turns on the first switch 145.

The voltage of the point "A" becomes lower if the AC power is suspended, and this means that the remaining voltage of the first capacitor 111 is discharged by the discharging devices 141 and 143 due to the turning-on of the first switch 145. It takes only 0.72 seconds to decrease the remaining voltage to 54V, and this confirms that the remaining voltage is discharged within a considerably short time.

The discharging circuit unit 77 according to the exemplary embodiment discharges the remaining voltage promptly if the input of the AC power is suspended, and does not discharge the voltage even if the AC power is not input, thereby preventing unnecessary power consumption.

Figure 5:
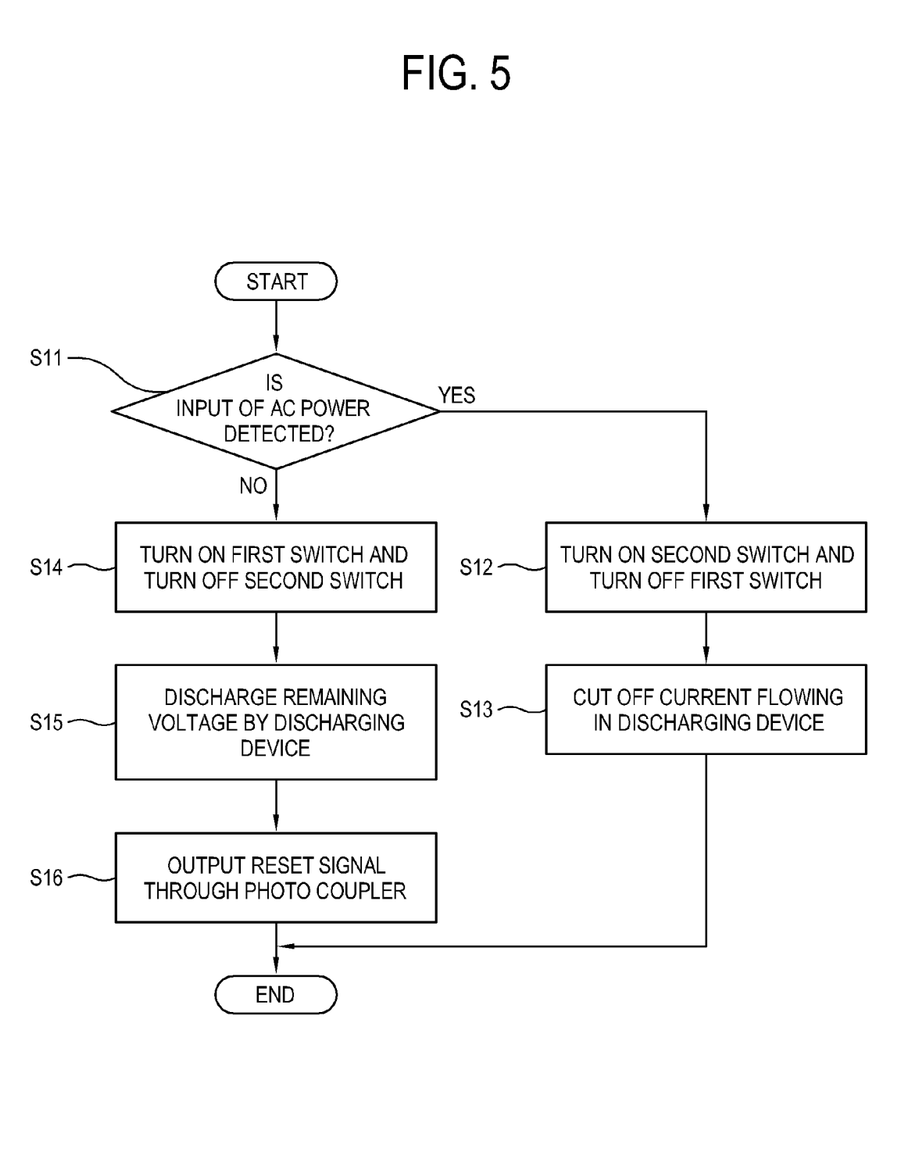
FIG. 5 is a flowchart of an operation of a discharging circuit unit of the display apparatus according to an exemplary embodiment

FIG. 5 is a flowchart of the operation of the discharging circuit unit 77 of the display apparatus 100 according to an exemplary embodiment.

As shown therein, the input of the external commercial AC power to the power supply unit 60 of the display apparatus 100 according to the exemplary embodiment is detected (S11). The input of the AC power is detected by the AC power detecting circuit unit 75 of the power supply unit 60.

If it is detected that the AC power is input, the second switch 135 is turned on, and the first switch 145 is turned off (S12). Due to the turning-off of the first switch 145, the current flow to the discharging devices 141 and 143 is cut off (S13). Accordingly, even if the AC power is input, unnecessary power consumption due to the discharging devices 141 and 143 is prevented as the current flow to the discharging devices 141 and 143 is cut off.

If it is detected that the AC power is not input, the first switch 145 is turned on, and the second switch 135 is turned off (S14). The remaining voltage is discharged by the discharging devices 141 and 143 due to the turning-on of the first switch 145 (S15). The photo coupler 147 is turned on by the turn-on of the first switch 145 and the reset signal is output to the reset circuit of the display apparatus 100 (S16), and the display apparatus 100 performs the reset operation.

The aspects are not limited to the foregoing exemplary embodiments, and may be performed in various methods within the scope of the claims. For example, according to another exemplary embodiment, an additional power supply device (not shown), which is the same, or similar to the power supply unit 60 according to the exemplary embodiments, may supply operating power to the display apparatus 100. Further, the additional power supply device which is the same, or similar to, the power supply unit 60, may supply operating power to other various electric devices requiring the operating power, as well as the display apparatus 100.

As described above, a display apparatus, a power supply apparatus and a power supply method thereof according to the exemplary embodiment includes a discharging circuit unit which removes a remaining voltage from a power supply unit if an input of AC power is suspended, and does not consume power in a standby mode.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
a signal processor which processes an image signal;
a display unit which displays an image corresponding to the processed image signal; and
a power supply unit which receives an input of alternating current (AC) power and supplies operating power to the display unit;
wherein the power supply unit comprises an AC filter, a rectifier and a discharging circuit unit which discharges a remaining voltage of the AC filter if the input of the AC power is suspended, and does not discharge the voltage if the input of the AC power is detected,
wherein the AC filter is provided between the AC power and the rectifier,
wherein the discharging circuit unit comprises a discharging device which discharges the remaining voltage of the AC filter, and a first switch which controls a current caused by the remaining voltage of the AC filter to flow in the discharging device when the input of the AC power is suspended, and
wherein the first switch controls a current not to flow in the discharging device when the input of the AC power is detected.

2. The display apparatus according to claim 1, the discharging circuit unit further comprises a photo coupler which is connected to a first end of the first switch and outputs a signal to a reset circuit that resets the display apparatus, and
the first switch turns on the photo coupler when the first switch is turned on.

3. The display apparatus according to claim 2, the power supply unit further comprises an AC power detecting circuit unit which is connected to a first end of the discharging device and detects the input of the AC power.

4. The display apparatus according to claim 3, wherein the AC power detecting circuit unit comprises a detecting device which detects the AC power, and a second switch which is controlled corresponding to the detection of the AC power, and the second switch is turned on when the AC power is detected by the detecting device.

5. The display apparatus according to claim 4, wherein the detecting device detects AC power with a predetermined voltage in a standby mode in which power consumption is reduced.

6. The display apparatus according to claim 4, wherein the detecting device comprises at least one zener diode.

7. The display apparatus according to claim 1, wherein the discharging device comprises at least one of a diode and a resistance device.

8. A power supply apparatus of an electric device, the power supply apparatus comprising:
   an AC filter which filters input alternating current (AC) power;
   a rectifier which rectifies an output current of the AC filter;
   an AC power detecting circuit unit which detects input of the AC power from the rectified current; and
   a discharging circuit unit comprising a discharging device which discharges a remaining voltage of the AC filter if the input of the AC power is not detected by the AC power detecting circuit unit, and does not discharge the voltage if the input of the AC power is detected,
   wherein the AC filter is provided between the AC power and the rectifier,
   wherein the discharging circuit unit further comprises a first switch which controls a current caused by the remaining voltage of the AC filter to flow in the discharging device when the input of the AC power is suspended, and
   wherein the first switch controls a current not to flow in the discharging device when the input of the AC power is detected.

9. The power supply apparatus according to claim 8, the discharging circuit unit further comprises a photo coupler which is connected to a first end of the first switch and outputs a signal to a reset circuit that resets the display apparatus, and the first switch turns on the photo coupler when the first switch is turned on.

10. The power supply apparatus according to claim 9, wherein the AC power detecting circuit unit comprises a detecting device which detects the AC power, and a second switch which is controlled corresponding to the detection of the AC power by the detecting device, and
   the second switch is turned on when the AC power is detected by the detecting device.

11. The power supply apparatus according to claim 10, wherein the detecting device comprises at least one zener diode.

12. The power supply apparatus according to claim 8, wherein the discharging device comprises at least one of a diode and a resistance device.

13. A power supply method which receives alternating current (AC) power and supplies operating power to an electric device, the method comprising:
   detecting an input of AC power;
   discharging a remaining voltage of an AC filter of a power supply unit if the input of the AC power is not detected by a discharging device of a discharging circuit unit according to a result of the detection, and not discharging the voltage if the input of the AC power is detected;
   controlling, by a first switch, a current caused by the remaining voltage of the AC filter to flow in the discharging device when the input of the AC power is suspended, and
   controlling, by the first switch, a current not to flow in the discharging device when the input of the AC power is detected.

14. The power supply method according to claim 13, further comprising turning on a photo coupler by the turned-on first switch and outputting a signal to a reset circuit that resets the electric device.

15. The power supply method according to claim 14, wherein the AC power detecting circuit unit comprises a detecting device which detects the AC power, and a second switch which is controlled according to the detection of the AC power by the detecting device,
   the method further comprising turning on the second switch if the AC power is detected by the detecting device.

16. The power supply method according to claim 15, wherein the detecting device detects AC power having a predetermined voltage in a standby mode in which power consumption is reduced.

* * * * *